United States Patent
Prick et al.

(10) Patent No.: US 12,452,735 B2
(45) Date of Patent: Oct. 21, 2025

(54) OPTIMIZING A RADIO PERFORMANCE OF A WIRELESS NETWORK

(71) Applicant: Rohde & Schwarz GmbH & Co. KG, Munich (DE)

(72) Inventors: Joachim Prick, Essen (DE); Andreas Holtkamp, Wuerselen (DE); Kevin Schwarz, Gangelt (DE); Rasmus Wormstaedt, Aachen (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 425 days.

(21) Appl. No.: 18/157,165

(22) Filed: Jan. 20, 2023

(65) Prior Publication Data
US 2023/0403605 A1 Dec. 14, 2023

(30) Foreign Application Priority Data
Jun. 9, 2022 (EP) .................................... 22178025

(51) Int. Cl.
*H04W 28/08* (2023.01)
*H04W 16/18* (2009.01)
*H04W 72/0453* (2023.01)

(52) U.S. Cl.
CPC ....... *H04W 28/0983* (2020.05); *H04W 16/18* (2013.01); *H04W 72/0453* (2013.01)

(58) Field of Classification Search
None
See application file for complete search history.

(56) References Cited

U.S. PATENT DOCUMENTS 9,736,703 B2 * 8/2017 Goldsmith ............ H04W 24/02
9,992,737 B2   6/2018 Jupudi et al.
(Continued)

FOREIGN PATENT DOCUMENTS

CN     112839362 A    5/2021

OTHER PUBLICATIONS

Wang et al., "Self-Organizing Channel Assignment for High Density 802.11 WLANs", 2014 IEEE.
(Continued)

*Primary Examiner* — The Hy Nguyen
(74) *Attorney, Agent, or Firm* — Studebaker Brackett PLLC

(57) ABSTRACT

Disclosed are a method (1) of and a management entity (23) for optimizing a radio performance of a wireless network (2). The wireless network (2) comprises a plurality (C) of communication channels and a plurality (N) of configurable radio access entities (21). The method (1) comprises determining (11), by a respective configurable radio access entity (21, $i$) of the plurality of configurable radio access entities (21), a respective set of receivable radio access entities (21, 22, $j$) in a particular communication channel of the plurality of communication channels. The method (1) further comprises collecting (12), by a management entity (23), the respective set of the receivable radio access entities (21, 22, $j$) determined by the respective configurable radio access entity (21, $i$) of the plurality of configurable radio access entities (21, $i$). The method (1) further comprises optimizing (13), by the management entity (23), the radio performance of the wireless network (2) in accordance with the respective set of the receivable radio access entities (21, 22, $j$) collected from the plurality of configurable radio access entities (21, $i$). The resulting channel allocation is quickly obtainable, straightforward to understand, and therefore enables users (Continued)

with even a little radio communications background to quickly and safely carry out a professional frequency optimization.

19 Claims, 5 Drawing Sheets

(56) References Cited

U.S. PATENT DOCUMENTS

| | | | |
|---|---|---|---|
| 2013/0272285 A1* | 10/2013 | Goldsmith | H04W 24/02 370/338 |
| 2014/0328190 A1 | 11/2014 | Lord et al. | |
| 2018/0368146 A1 | 12/2018 | Jeunen et al. | |
| 2019/0059048 A1* | 2/2019 | Yeoh | H04W 24/10 |
| 2019/0159205 A1 | 5/2019 | Mercier et al. | |
| 2021/0368362 A1 | 11/2021 | Rengarajan et al. | |

OTHER PUBLICATIONS

Kauffmann et al., "Measurement-Based Self Organization of Interfering 802.11 Wireless Access Networks", 2007 IEEE.

Luo et al., "A Distributed Dynamic Channel Allocation Technique for Throughput Improvement in a Dense WLAN Environment", 2004 IEEE.

Mishra et al., "A Client-driven Approach for Channel Management in Wireless LANs", 2006 IEEE.

Bejerano et al., "Fairness and Load Balancing in Wireless LANs Using Association Control", 2007 IEEE.

The extended European search report issued by the European Patent Office on Nov. 23, 2022, which corresponds to European Patent Application No. 22178025.7-1216.

* cited by examiner

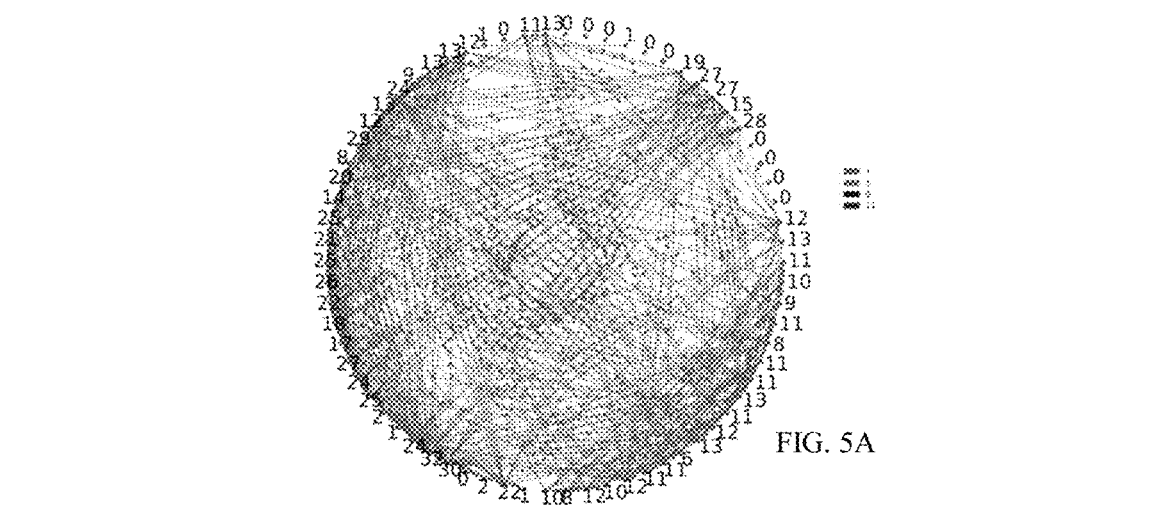
FIG. 5A
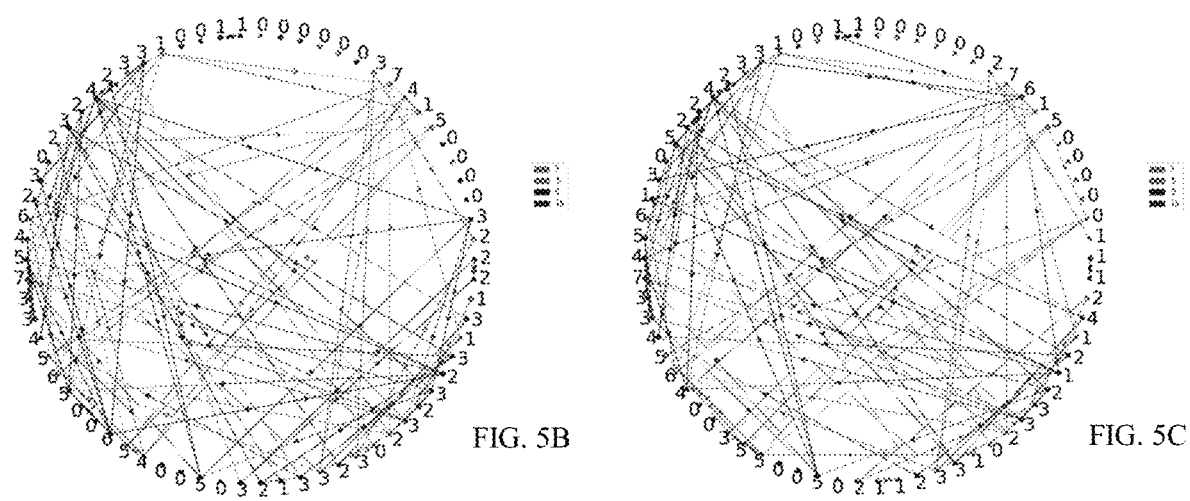
FIG. 5B
FIG. 5C
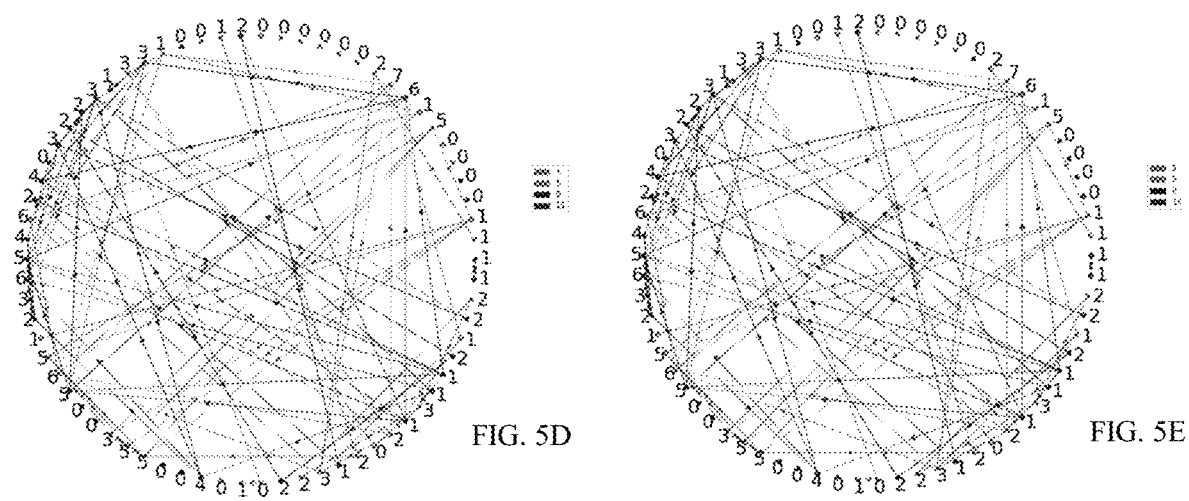
FIG. 5D
FIG. 5E

OPTIMIZING A RADIO PERFORMANCE OF A WIRELESS NETWORK

TECHNICAL FIELD

The present disclosure relates to wireless networks, and in particular to a method of and a management entity for optimizing a radio performance of a wireless network, to a system comprising said management entity and to a computer program.

BACKGROUND ART

Optimization of Wi-Fi channel allocation has become a challenge due to a steady rise in numbers of access points and Wi-Fi networks as well as increasing requirements as regards network availability and network capacity especially in a professional environment. On a small scale at home, e.g. when setting up consumer access points, questions arise such as: Which channel is the best? Which channel bandwidth should be selected? In the case of multiple access points: Which channel should be allocated to the respective access point in order to make the Wi-Fi network as interference-free and powerful as possible?

The channel allocation and thus the quality of the distribution of access points across the available radio spectrum often dominates a Wi-Fi network's network performance. Especially in very large Wi-Fi networks (e.g. in "high-density" environments such as exhibition halls, stadiums, schools and universities, etc.) or in environments with many neighboring access points (such as in inner-city areas or in multi-story office buildings), efficient channel allocation is crucial.

Renowned manufacturers of Wi-Fi network systems thus provide their own procedures for channel allocation. No matter if the underlying optimization is performed locally or (somewhat) globally, the resulting channel allocation may be hard to understand, and these procedures barely support troubleshooting and manual analysis.

SUMMARY

These and other drawbacks and limitations are overcome by the embodiments as defined by the appended independent claims. Preferred embodiments are set forth in the dependent claims and in the following description and drawings.

A first aspect of the present disclosure relates to a method of optimizing a radio performance of a wireless network. The wireless network comprises a plurality of communication channels and a plurality of configurable radio access entities. The method comprises determining, by a respective configurable radio access entity of the plurality of configurable radio access entities, a respective set of receivable radio access entities in a particular communication channel of the plurality of communication channels. The method further comprises collecting, by a management entity, the respective set of the receivable radio access entities determined by the respective configurable radio access entity of the plurality of configurable radio access entities. The method further comprises optimizing, by the management entity, the radio performance of the wireless network in accordance with the respective set of the receivable radio access entities collected from the plurality of configurable radio access entities.

The determining of the respective set of the receivable radio access entities in the particular communication channel may comprise one or more of: configuring the respective configurable radio access entity to use the particular communication channel of the plurality of communication channels and to transmit on the same for an indicated time period; listening, by each of the plurality of configurable radio access entities, the particular communication channel responsive to a trigger event; and scanning, by each of the plurality of configurable radio access entities, the particular communication channel in a background of regular radio operation of the respective configurable radio access entity.

The optimizing of the radio performance of the wireless network may comprise: determining, for the respective configurable radio access entity, a respective total number of the receivable radio access entities in the plurality of communication channels; defining an order of a respective configurable radio access entity of interest in the plurality of configurable radio access entities in accordance with a decreasing order of the respective total number; and processing each of the plurality of configurable radio access entities as the respective configurable radio access entity of interest in accordance with the defined order.

The processing may comprise computing a baseline value of a metric for the respective configurable radio access entity of interest in a respective presently intended communication channel. The respective presently intended communication channel may be retrievable from a channel allocation vector comprising the respective presently intended communication channel of the plurality of configurable radio access entities. The computing may be performed in accordance with: the respective receivable radio access entity of the respective configurable radio access entity of interest, and/or the respective configurable radio access entity comprising the respective configurable radio access entity of interest in its respective receivable radio access entities.

The computing of the baseline value may further be performed in accordance with a respective weight of the respective configurable radio access entity.

The respective weight may be defined in accordance with one or more of: machine learning from a real usage behavior of the wireless network, and a pre-configuration.

The processing may further comprise updating a respective number of the receivable radio access entities of the respective configurable radio access entity of interest in a respective candidate communication channel. The respective candidate communication channel may be selectable from a whitelist of those of the plurality of communication channels being useable by the respective receivable radio access entity.

The processing may further comprise computing a prospective value of the metric for the respective configurable radio access entity of interest in the respective candidate communication channel. The computing may be performed in accordance with: the respective receivable radio access entity of the respective configurable radio access entity of interest, and/or the respective configurable radio access entity may comprise the respective configurable radio access entity of interest in its respective receivable radio access entities.

The computing of the prospective value may further be performed in accordance with the respective weight of the respective configurable radio access entity.

The processing may further comprise accepting the respective candidate communication channel as the respective presently intended communication channel of the respective configurable radio access entity of interest in accordance with at least one acceptance criterion of: the prospective value of the metric is lower than the baseline value of the metric; and the prospective value of the metric equals the baseline value of the metric, and an occurrence of the respective candidate communication channel in the channel allocation vector is less than an occurrence of the respective presently intended communication channel in the channel allocation vector.

The method may further comprise providing, by the management entity, a visualization of a result of the optimizing.

The result of the optimizing may comprise one or more of: a graph node for the respective receivable radio access entity, a graph edge from the respective receivable radio access entity to the respective configurable radio access entity, any of the above colored in accordance with the respective presently intended communication channel, the respective number of the receivable radio access entities of the respective configurable radio access entity in its respective presently intended communication channel, the total number of the receivable radio access entities of the respective configurable radio access entity in the plurality of communication channels, and any of the above before, during, and/or after the optimizing.

The method may further comprise configuring the respective configurable radio access entity to use the respective presently intended communication channel in the channel allocation vector as its respective communication channel.

The wireless network may comprise an IEEE 802.11 wireless local area network, WLAN ("Wi-Fi"), and the respective configurable radio access entity may comprise an access point, AP.

The plurality of receivable radio access entities may comprise the plurality of configurable radio access entities.

The plurality of receivable radio access entities may further comprise one or more radio access entities not being configurable by the management entity.

The management entity may comprise one of: a cloud-based management entity, a controller of the wireless network, and a particular configurable radio access entity of the plurality of configurable radio access entities of the wireless network.

A second aspect of the present disclosure relates to a management entity for optimizing a radio performance of a wireless network. The wireless network comprises a plurality of communication channels, and a plurality of configurable radio access entities. The management entity comprises a processor configured to: collect a respective set of receivable radio access entities determined by a respective configurable radio access entity of the plurality of configurable radio access entities in a particular communication channel of the plurality of communication channels; and optimize the radio performance of the wireless network in accordance with the respective set of the receivable radio access entities in the particular communication channel collected from the plurality of configurable radio access entities.

The processor may further be configured to perform the method according to the first aspect or any of its implementations.

A third aspect of the present disclosure relates to a system, comprising a wireless network comprising a plurality of communication channels and a plurality of configurable radio access entities; the system further comprising a management entity according to the second aspect or any of its implementations for optimizing a radio performance of the wireless network.

A fourth aspect of the present disclosure relates to computer program, comprising instructions which, when the program is executed by a computer, cause the computer to carry out the method according to the first aspect or any of its implementations.

Advantageous Effects

The disclosed method generally attempts to reduce the number of radio conflicts on the one hand and to equally distribute the access points across all available radio channels on the other hand.

Unlike local optimization methods, the disclosed method performs channel allocation with a view to increasing the performance of the entire Wi-Fi network, thereby taking a holistic approach.

In accordance with real usage behavior, selected access points may be given preference in the sense of demand-driven prioritization.

The method is deterministic, which offers the advantage that repeated calculations with identical input parameters result in a same channel allocation. This in turn enables a decentralized approach without any central cloud and/or Wi-Fi controller management instance.

The method does not require any human intervention, resulting in quick performance improvements.

This in turn facilitates channel re-assignment during ongoing operations as well, in response to a changing radio environment, be it through changes in usage, or due to removal or failure of access points, for example.

By means of a visualization of existing/remaining radio conflicts that is straightforward to understand, the method further enables users with even a little radio communications background to quickly and safely carry out a professional frequency optimization and to thereby optimize the radio performance.

The technical effects and advantages previously described equally apply to the method of and a management entity for optimizing a radio performance of a wireless network having corresponding features.

BRIEF DESCRIPTION OF DRAWINGS

The above-described aspects and implementations will now be explained with reference to the accompanying drawings, in which the same or similar reference numerals designate the same or similar elements.

The features of these aspects and implementations may be combined with each other unless specifically stated otherwise.

Figure 1:
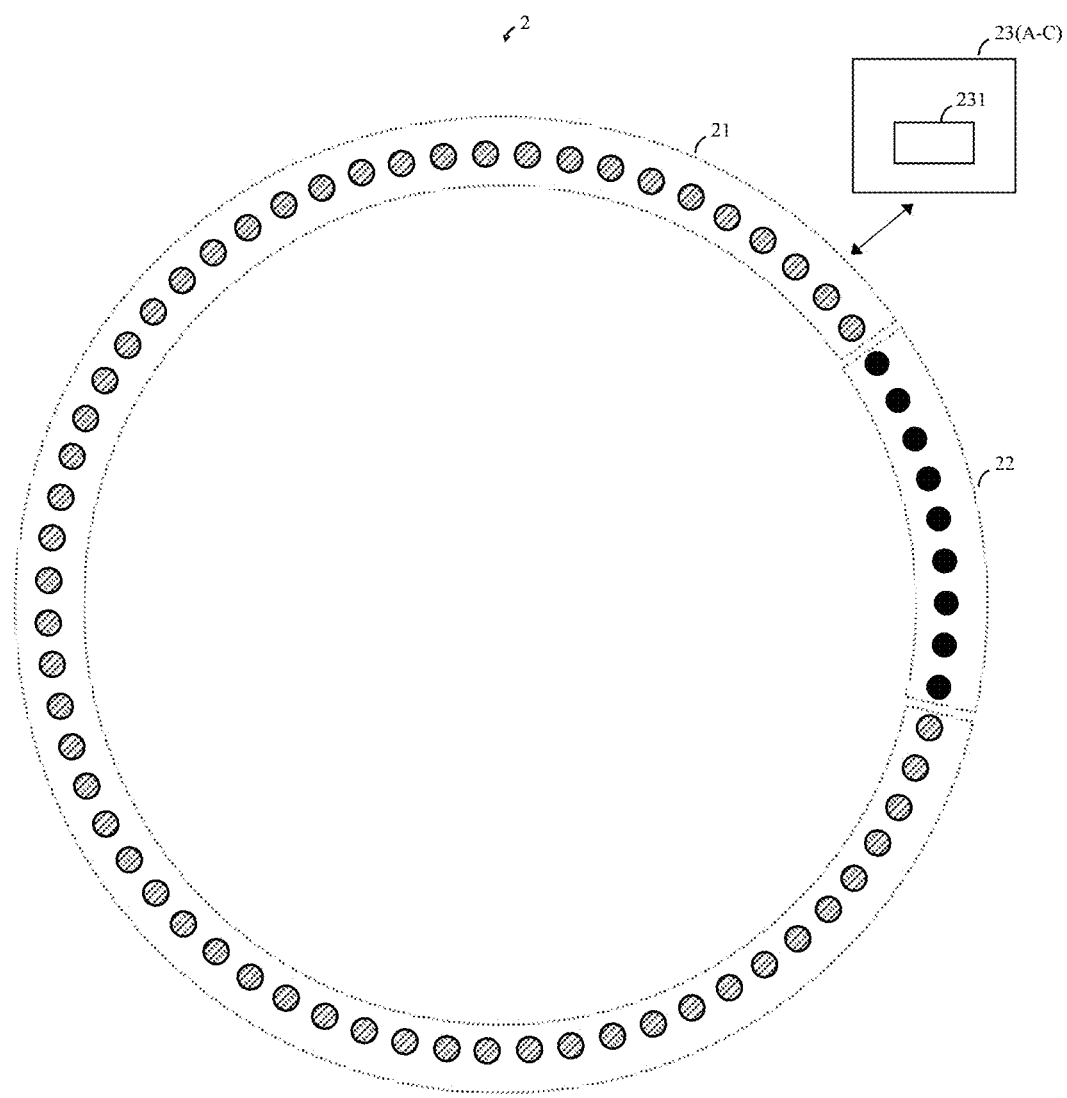

The drawings are to be regarded as being schematic representations, and elements illustrated in the drawings are not necessarily shown to scale. Rather, the various elements are represented such that their function and general purpose become apparent to those skilled in the art.

Figure 2:
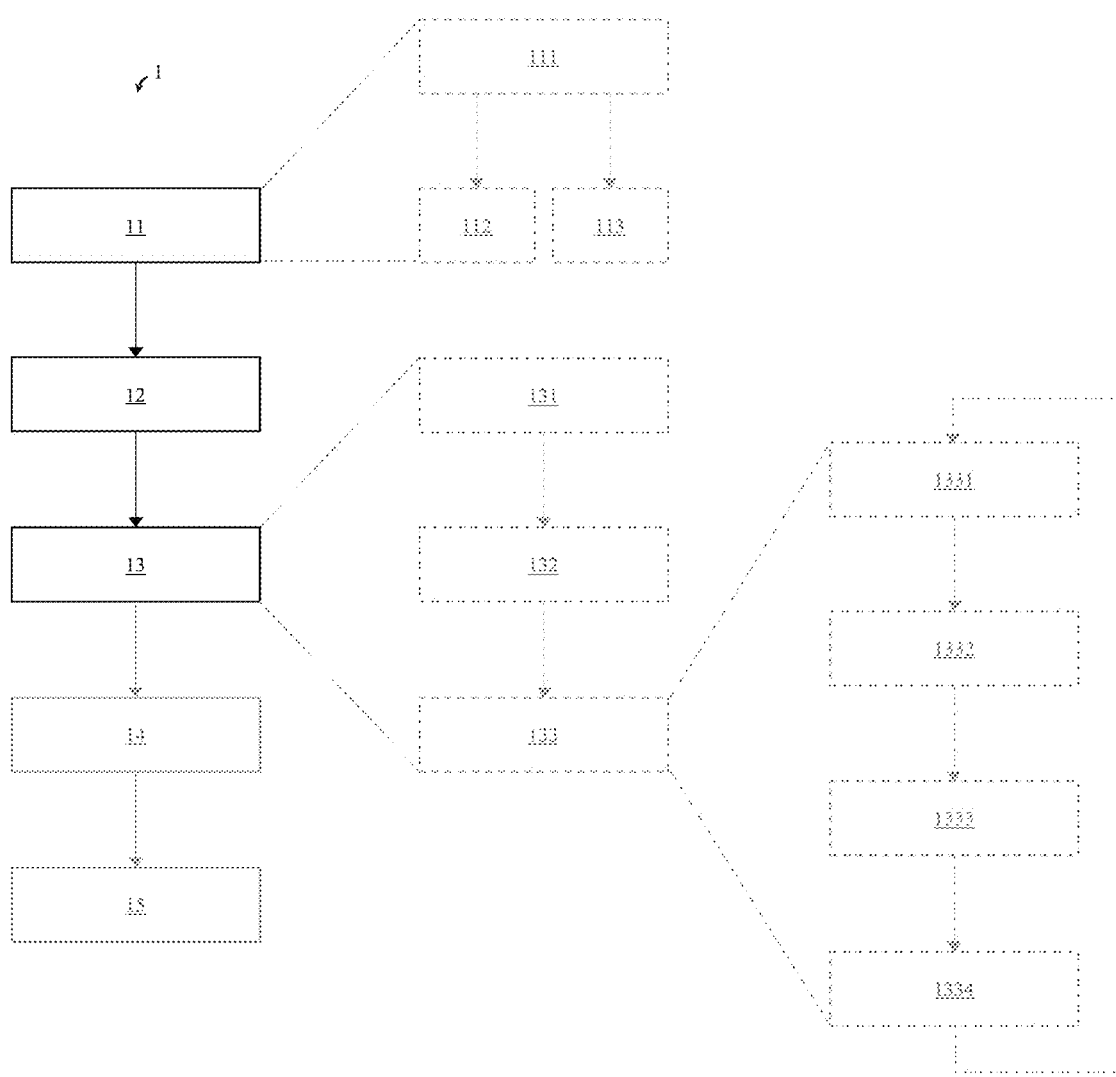
Figure 3:
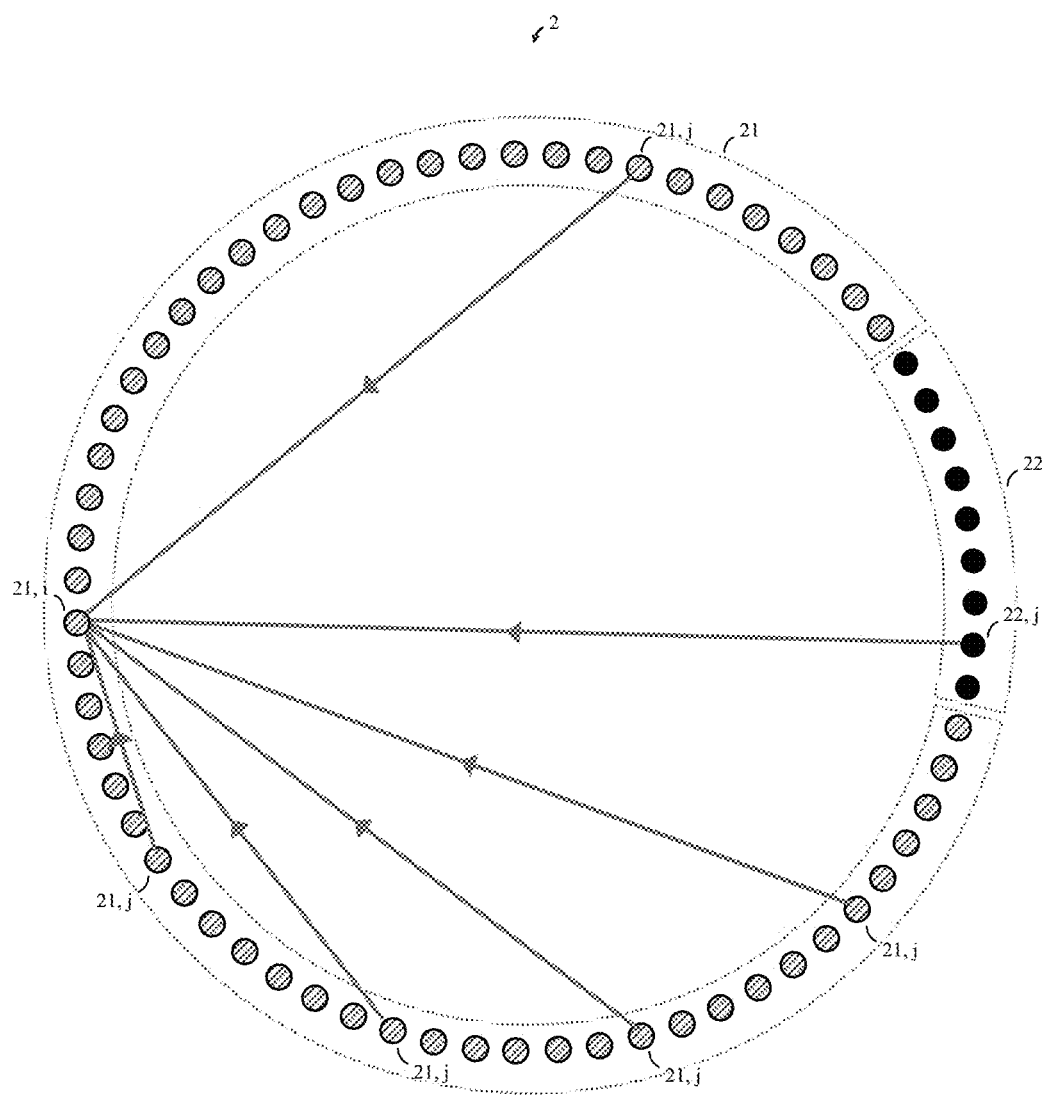
Figure 4:
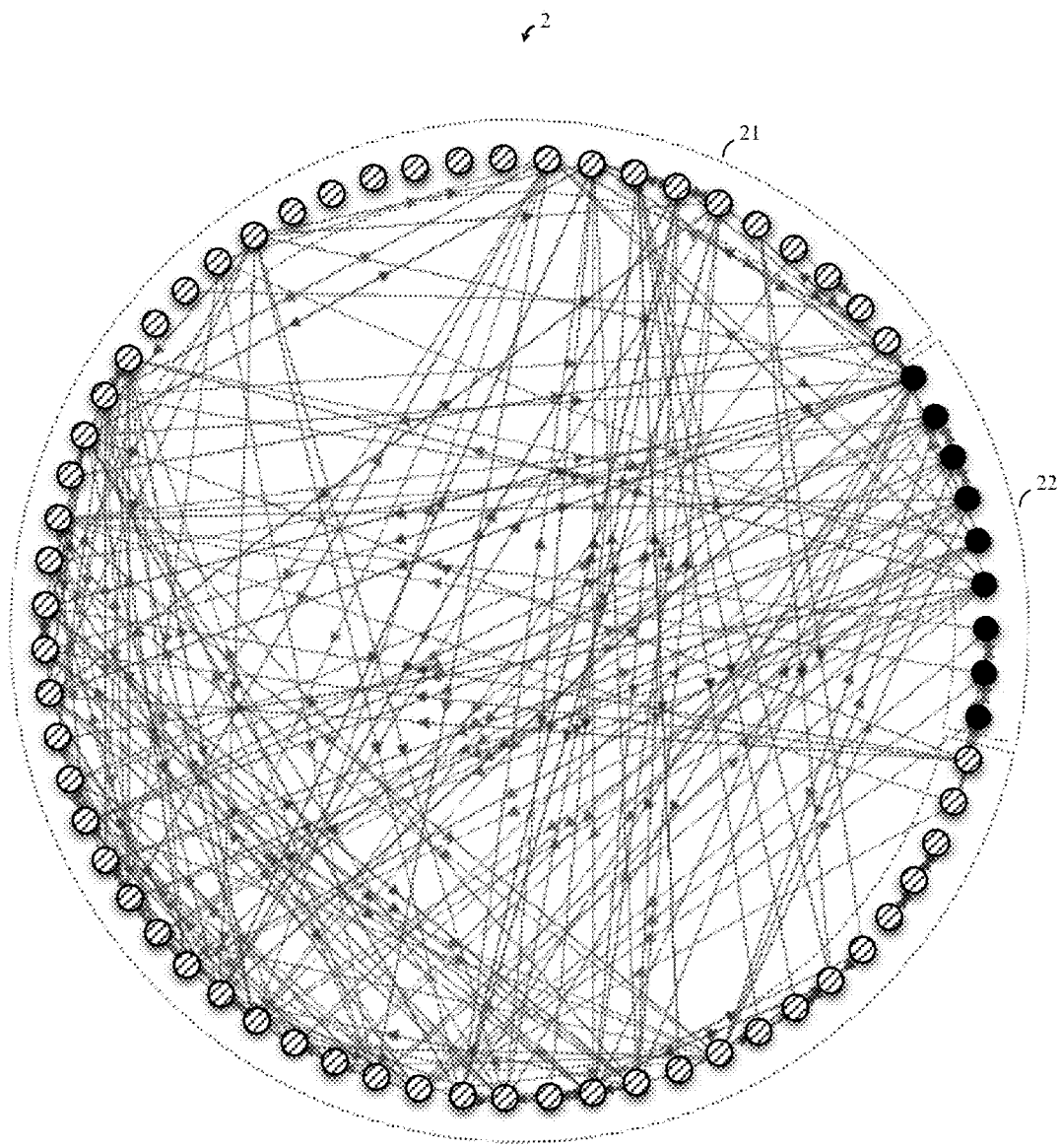

FIG. 1 illustrates an exemplary network system comprising a management entity in accordance with the present disclosure and a wireless network;

FIG. 2 illustrates a method of optimizing a radio performance of a wireless network in accordance with the present disclosure;

FIG. 3 illustrates an exemplary set of receivable radio access entities determined by a configurable radio access entity in the exemplary network system of FIG. 1;

FIG. 4 illustrates a superpositioning of the respective sets of the receivable radio access entities determined by each of the plurality of configurable radio access entities in the exemplary network system of FIG. 1; and FIGS. 5A-5E illustrate visualizations of respective results of subsequent optimization steps of the optimizing in another exemplary network system.

DETAILED DESCRIPTIONS OF DRAWINGS

FIG. 1 illustrates an exemplary network system comprising a management entity 23 in accordance with the present disclosure, and a wireless network 2.

The wireless network 2 may particularly comprise an IEEE 802.11 wireless local area network (WLAN/Wi-Fi).

IEEE 802.11 technical standards may use various radio frequency bands reserved internationally for industrial, scientific and medical (ISM) purposes including, but not limited to, 2.4 GHz (2.400-2.500 GHz), 5 GHz (4.915-5.925 GHz), 6 GHz (5.925-7.125 GHz) and other frequency bands. In general, users have no regulatory protection in these bands.

The wireless network 2 comprises a plurality C of communication channels.

As used herein, "communications channels" may refer to non-overlapping radio frequency bands which do not (significantly) interfere with one another.

The plurality C of communication channels varies significantly by regulatory domain and channel bandwidth. For example, within the 2.4 GHz frequency band and for a channel bandwidth of 20 MHz, C=4 in Germany (channel numbers 1, 5, 9 and 13, respectively) and C=3 in the USA (channel numbers 1, 6 and 11, respectively). Within the 2.4 GHz frequency band and for a channel bandwidth of 40 MHz, C=2 in Germany (channel numbers 3 and 11, respectively) and C=1 in the USA (channel number 3). Similar provisions apply for other frequency bands, such as the 5 GHz frequency band.

The management entity 23 shown on the top right of FIG. 1 comprises a processor 231 and is designed for optimizing a radio performance of the wireless network 2. In particular, the processor 231 is configured to perform particular steps of a method 1 which will be explained in more detail in connection with FIG. 2.

The management entity 23 may comprise one of: a cloud-based management entity 23A, a controller of the wireless network 23B, and a particular configurable radio access entity 23C of the plurality of configurable radio access entities 21 of the wireless network 2.

In accordance with FIG. 1, the underlying structure of the optimization problem is modeled as a graph, wherein a plurality N of configurable radio access entities 21 of the wireless network 2 forms (cross-hatched) nodes of the graph. In particular, the respective configurable radio access entity 21, $i$ of the plurality N of configurable radio access entities 21 may comprise an access point (AP).

$N \in \mathbb{N}^+$

Number of the plurality of configurable radio access entities 21

$i \in \mathbb{N}_1^N$

Index of the plurality of configurable radio access entities 21

As used herein, "configurable" may mean that the respective radio access entity 21 being designated as "configurable" is configurable by (i.e., under control of) the management entity 23.

The plurality N of configurable radio access entities 21 may form part of a plurality of receivable radio access entities 21, 22 being arranged circularly in FIG. 1 for a better visual understanding.

$M \in \mathbb{N}^+ \geq N$

Number of the plurality of receivable radio access entities 21, 22

$j \in \mathbb{N}_1^M$

Index of the plurality of receivable radio access entities 21, 22

As used herein, "receivable" may mean that a transmit power of the respective radio access entity 21, 22 being designated as "receivable" can be received by at least one of the plurality N of configurable radio access entities 21, in view of transmission circumstances such as boresights, radiation patterns, and a distance of the involved radio antennas.

In accordance with FIG. 1, one or more radio access entities 22 not being configurable by the management entity 23 may form part of the plurality of receivable radio access entities 21, 22 as well, and may thus form (solid) nodes of the graph, too. The one or more radio access entities 22 may respectively comprise an AP or any other source of interference.

Thereby, it is taken into account that radio conflicts do not only occur within the wireless network 2 but can also be caused by radio access entities 22, $j$ of other wireless networks as well.

FIG. 2 illustrates a method 1 of optimizing a radio performance of a wireless network 2 in accordance with the present disclosure.

A brief implementation of the method 1 (indicated by solid lines on the left of FIG. 2) comprises determining 11, collecting 12 and optimizing 13 steps.

More detailed implementations (indicated by shaded dashed lines on the right of FIG. 2) may further comprise various refinements of the determining 11 and/or the optimizing 13 steps.

More extensive implementations (indicated by shaded solid lines on the left of FIG. 2) may further comprise providing 14 and/or configuring 15 steps.

With reference to FIG. 1, the method 1 starts off with determining 11, by a respective configurable radio access entity 21, $i$ of the plurality of configurable radio access entities 21, a respective set of receivable radio access entities 21, 22, $j$ in a particular communication channel of the plurality of communication channels.

The determining 11 of the respective set of the receivable radio access entities 21, 22, $j$ in the particular communication channel may comprise configuring 111 the respective configurable radio access entity 21, $i$ to use the particular communication channel of the plurality of communication channels and to transmit on the same for an indicated time period. For example, within the 2,4 GHz frequency band and for a channel bandwidth of 20 MHz, any one of the channel numbers 1, 5, 9 and 13 may be configured 111 as the particular communication channel to start with. Thereby, each of the plurality of configurable radio access entities 21, $i$ indicates its presence on the particular communication channel by transmitting on the same, to enable being determined 11 as a receivable radio access entity 21, 22, $j$.

The determining 11 of the respective set of the receivable radio access entities 21, 22, $j$ in the particular communication channel may comprise listening 112, by each of the plurality of configurable radio access entities 21, $i$, the particular communication channel responsive to a trigger event. Thereby, while still indicating its presence on the particular communication channel, each of the plurality of configurable radio access entities 21, $i$ identifies any receivable radio access entities 21, 22, $j$ on the particular communication channel.

The determining 11 of the respective set of the receivable radio access entities 21, 22, $j$ in the particular communication channel may comprise scanning 113, by each of the plurality of configurable radio access entities 21, $i$, the plurality C of communication channels in a background of regular radio operation of the respective configurable radio access entity 21, $i$. Thereby, each of the plurality of configurable radio access entities 21, $i$ identifies any receivable radio access entities 21, 22, $j$ in any of the plurality C of communication channels besides the respectively allocated/used communication channel.

FIG. 3 illustrates an exemplary set of receivable radio access entities 21, 22, $j$ determined by a configurable radio access entity 21, $i$ in the exemplary network system of FIG. 1.

The depicted set of receivable radio access entities 21, 22, $j$ is visualized by graph edges from the respective receivable radio access entity 21, 22, $j$ of the set to the respective configurable radio access entity 21, $i$. In this example, six graph edges connect the configurable radio access entity 21, $i$ on the left of FIG. 3 to a respective receivable radio access entity 21, 22, $j$.

While the entities 21, 22, $j$ in FIGS. 1 and 3 (and FIGS. 4 and 5A-5E as well) are arranged circularly, alternative arrangements may include arc diagrams in which the graph nodes are arranged along a line and the graph edges are being drawn as semicircles in one or both of the two halfplanes bounded by the line.

Each graph edge represents a capability of the configurable radio access entity 21, $i$ on the one end of the graph edge to receive a transmit power of the receivable radio access entity 21, 22, $j$ on the other end of the graph edge. Put another way, each graph edge stands for a potential radio conflict, because each of the plurality of configurable radio access entities 21, $i$ is provided for communication with its radio clients rather than with other receivable radio access entities 21, 22, $j$.

As such, the schematic visualization based on graph nodes representing the plurality of receivable radio access entities 21, 22, $j$ and on graph edges representing potential radio conflicts is straightforward to understand even for users with little radio communications background.

Said receiving capability may or may not be reciprocal (bidirectional), meaning that the respective receivable radio access entity 21, 22, $j$ may or may not be able to receive a transmit power of the configurable radio access entity 21, $i$ on its part, for example due to different transmit powers or radiation patterns.

This observation gives rise to the concept of "neighborhood" of a particular configurable radio access entity 21, $i$. Said neighborhood N(i) includes all entities 21, 22, $j$ being receivable by the particular configurable radio access entity 21, $i$ (negative neighborhood $N^-(i)$) as well as all entities 21, $j$ being able to receive the particular configurable radio access entity 21, $i$ on their part (positive neighborhood $N^+(i)$):

$$N(i) = N^-(i) \cup N^+(i)$$

Returning to FIG. 2, the method 1 further comprises collecting 12, by a management entity 23, the respective set of the receivable radio access entities 21, 22, $j$ determined by the respective configurable radio access entity 21, $i$ of the plurality of configurable radio access entities 21, $i$. In other words, the management entity 23 is configured to collect 12 from each of the plurality N of configurable radio access entities 21, $i$ the respective set of receivable radio access entities 21, 22, $j$ determined by that specific configurable radio access entity 21, $i$.

The management entity (23) comprises a processor (231) configured to: collect (12) a respective set of receivable radio access entities (21, 22, $j$) determined (11) by a respective configurable radio access entity (21, $i$) of the plurality of configurable radio access entities (21) in a particular communication channel of the plurality of communication channels FIG. 4 illustrates a superpositioning of the respective sets of the receivable radio access entities 21, 22, $j$ determined by each of the plurality of configurable radio access entities 21, $i$ in the exemplary network system of FIG. 2.

Bidirectional graph edges represent receiving capabilities (i.e., potential radio conflicts) on both ends of the graph edge, whereas unidirectional graph edges stand for a receiving capability (and a potential radio conflict) on one end only.

Returning to FIG. 2, the method 1 further comprises optimizing 13, by the management entity 23, the radio performance of the wireless network 2 in accordance with the respective set of the receivable radio access entities 21, 22, $j$ collected from the plurality of configurable radio access entities 21, $i$.

The optimizing 13 involves examining each the plurality of configurable radio access entities 21, $i$ in descending order according to its respective number of radio conflicts, which corresponds to its respective total number $c_i$ of the receivable radio access entities 21, 22, $j$ in the plurality C of communication channels.

$$\alpha = (\alpha_{i,j})$$

Adjacency matrix, defining a receivability $\alpha_{i,j} \in \{0,1\}$ of the respective receivable radio access entity 21, 22, $j$ by the respective configurable radio access entity 21, $i$ when allocated to a same communication channel. The adjacency matrix may be composed of the sets of receivable radio access entities 21, 22, $j$ collected from each of configurable radio access entity 21, $i$.

$$x = (x_i)$$

Channel allocation vector, defining a presently intended communication channel $x_i$ (or $x_{pi}$) of a respective configurable radio access entity 21, $i$.

$$c = (c_i) = f(a, x)$$

Conflict vector, defining a total number $c_i$ of the receivable radio access entities 21, 22, $j$ (i.e., the number of radio conflicts) of a respective configurable radio access entity 21, $i$ in view of the presently intended channel allocation (as defined by the channel allocation vector).

The optimizing 13 of the radio performance of the wireless network 2 may therefore comprise:
  determining 131, for the respective configurable radio access entity 21, $i$, a respective total number $c_i$ of the receivable radio access entities 21, 22, $j$ (i.e., the respective number of radio conflicts) in the plurality C of communication channels;
  defining 132 an order p of a respective configurable radio access entity of interest 21, $p_i$ in the plurality of configurable radio access entities 21, $i$ in accordance with a decreasing order of the respective total number; and processing 133 each of the plurality of configurable radio access entities 21, $i$ as the respective configurable radio access entity of interest 21, $p_i$ in accordance with the defined order p.

Accordingly, the respective configurable radio access entity of interest 21, $p_i$ represents the respective configurable radio access entity 21, $i$ taken/chosen in the defined order p:

$$p=(p_i)$$

Permutation vector, defining a rank/index$_{pi}$ of the respective configurable radio access entity 21, $i$ according to the defined order p The processing 133 step may be regarded as a loop wherein loop cycles relate to respective configurable radio access entities of interest 21, $p_i$.

The processing 133 may comprise computing 1331 a baseline value of a metric for the respective configurable radio access entity of interest 21, $p_i$ in a respective presently intended communication channel $x_{pi}$ (which may initially correspond to the particular communication channel chosen in the determining 11 step):

$$\text{metric }(p_i) = c_{p_i} + \sum_{\forall i \in N^+(p)} c_i$$

The metric comprises as a first term a total number $c_{pi}$ of the receivable radio access entities 21, 22, $j$ (i.e., the number of radio conflicts) of the respective configurable radio access entity of interest 21, $p_i$ (in other words, a size of the negative neighborhood $N^-(p_i)$ of the entity of interest 21, $p_i$) in the presently intended communication channel $x_{pi}$.

The computing 1331 may thus be performed in accordance with the respective receivable radio access entity 21, 22, $j$ of the respective configurable radio access entity of interest 21, $p_i$.

The metric further comprises a second term including total numbers $c_i$ of the receivable radio access entities 21, 22, $j$ (i.e., the number of radio conflicts) of all entities 21, $i$ being able to receive the respective configurable radio access entity of interest 21, $p_i$ on their part (i.e., of the positive neighborhood $N^+(p_i)$ of the entity of interest 21, $p_i$) in the presently intended communication channel $x_{pi}$.

The computing 1331 may thus be performed also in accordance with the respective configurable radio access entity 21, $i$ comprising the respective configurable radio access entity of interest 21, $p_i$ in its respective set of receivable radio access entities 21, 22, $j$.

The computing 1331 of the baseline value may further be performed in accordance with a respective weight $w_i$ of the respective configurable radio access entity 21, $i$:

$$w_i$$

Weight, defining a relative importance of the plurality of configurable radio access entities 21 with respect to one another.

$$\text{weighted\_metric}(p_i) = w_{p_i} \cdot c_{p_i} + \sum_{\forall i \in N^+(p)} w_i \cdot c_i$$

The respective weight $w_{pi}$ (or $w_i$) may be used to manipulate a relative importance among the plurality of configurable radio access entities 21, and may be defined in accordance with machine learning from a real usage behavior of the wireless network 2 and/or a pre-configuration.

As such, the method 1 can be fed with real usage data from connected Wi-Fi clients and thus better adapt to an actual demand.

The resulting value of the metric is termed baseline value since it serves as a baseline/reference for subsequent comparisons.

At some point in the course of the processing 133 step/loop, each of the plurality of configurable radio access entities 21, $i$ will be considered as the respective configurable radio access entity of interest 21, $p_i$, and will therefore be subject to the computing 1331 of the baseline value.

Having obtained the baseline value of the conflict metric for the respective configurable radio access entity of interest 21, $p_i$ resulting in connection with the presently intended communication channel $x_{pi}$, the method 1 proceeds by evaluating the same conflict metric resulting in connection with other (candidate) communication channels to see if altering the presently intended communication channel $x_{pi}$ reduces the value of the conflict metric.

The following steps 1332-1334 may be carried out as part of an inner loop wherein loop cycles relate to respective candidate communication channels $x_{pi}'(\neq x_{pi})$.

The processing 133 may further comprise updating 1332 a respective number $c_i$ of the receivable radio access entities 21, 22, $j$ of the respective configurable radio access entity of interest 21, $p_i$ in a respective candidate communication channel $x_{pi}'$.

In other words, the above-mentioned conflict vector $c=(c_i)$ requires updating in view of the changed channel allocation ($x_{pi}'$ instead of $x_{pi}$ as the respective candidate communication channel):

$$c=(c_i)=f(\alpha,x)$$

The respective candidate communication channel $x_{pi}$ may be selectable from a whitelist whitelist$_j$ of those of the plurality C of communication channels being useable by the respective receivable radio access entity 21, 22, $j$. For example, the whitelist of the respective configurable radio access entity 21, $j$ may correspond to the plurality C of communication channels, whereas the whitelist of the respective radio access entity 22, $j$ not being configurable by the management entity 23 may correspond to a single invariant communication channel.

The processing 133 may further comprise computing 1333 a prospective value of the metric for the respective configurable radio access entity of interest 21, $p_i$ in the respective candidate communication channel:

$$\text{metric }(p_i) = c_{p_i} + \sum_{\forall i \in N^+(p)} c_i$$

The computing 1333 of the prospective value may further be performed in accordance with the respective weight $w_i$ of the respective configurable radio access entity 21, $i$:

$$\text{weighted\_metric}(p_i) = w_{p_i} \cdot c_{p_i} + \sum_{\forall i \in N^+(p)} w_i \cdot c_i$$

These metrics are exactly the same as already explained in connection with the computing 1331 step, the only difference being that their evaluation is based on an altered channel allocation and may thus result in a different (prospective) value of the metric.

As already mentioned, each of the plurality of configurable radio access entities 21, $i$ will be considered as the respective configurable radio access entity of interest 21, $p_i$ at some point in the course of the processing 133 step/loop.

In connection with the respective configurable radio access entity of interest 21, $p_i$ being considered, each of the communication channels selectable from its whitelist (except for the currently allocated communication channel) will be regarded as the respective candidate communication channel $x_{pi}'$ at some point in the course of the computing 1333 step/loop, and will therefore be subject to the computing 1333 of a prospective value.

The processing 133 step/loop may be repeated until a (local) optimum solution is found in accordance with the following accepting 1334 step.

The processing 133 may further comprise accepting 1334 the respective candidate communication channel $x_{pi}'$ as the respective presently intended communication channel $x_{pi}$ of the respective configurable radio access entity of interest 21, $p_i$ in accordance with at least one acceptance criterion of:
(I) the prospective value of the metric is lower than the baseline value of the metric, meaning that a channel allocation with less conflicts has been achieved; and
(II) the prospective value of the metric equals the baseline value of the metric, meaning that the conflicts have not been mitigated further, but an occurrence of the respective candidate communication channel $x_{pi}'$ in the channel allocation vector x is less than an occurrence of the respective presently intended communication channel $x_{pi}$ in the channel allocation vector x.

In a first fictional example, the baseline value of the metric for the respective configurable radio access entity of interest 21, $p_i$ in the respective presently intended communication channel $x_{pi}$ may amount to a total of 12 radio conflicts, and the prospective value of the metric for the respective configurable radio access entity of interest 21, $p_i$ in the respective candidate communication channel $x_{pi}'$ may amount to a total of 8 radio conflicts. As the prospective value (8) of the metric is lower than the baseline value (12) of the metric, the respective candidate communication channel $x_{pi}'$ will be accepted 1334 as the respective presently intended communication channel $x_{pi}$ in accordance with acceptance criterion I.

In a second fictional example, the baseline value of the metric for the respective configurable radio access entity of interest 21, $p_i$ in the respective presently intended communication channel $x_{pi}$ as well as the prospective value of the metric for the respective configurable radio access entity of interest 21, $p_i$ in the respective candidate communication channel $x_{pi}'$ may amount to a total of 12 radio conflicts. Additionally, an occurrence of the respective presently intended communication channel $x_{pi}$ in the channel allocation vector x amounts to 30, and an occurrence of the respective candidate communication channel $x_{pi}'$ in the channel allocation vector x amounts to 23. As the prospective value (12) of the metric equals the baseline value (12) of the metric, and the occurrence (23) of the respective candidate communication channel $x_{pi}'$ in the channel allocation vector x is less than the occurrence (30) of the respective presently intended communication channel $x_{pi}$ in the channel allocation vector x, the respective candidate communication channel $x_{pi}'$ will be accepted 1334 as the respective presently intended communication channel $x_{pi}$ in accordance with acceptance criterion II.

The underlying problem is that configurable radio access entities 21, $i$ sharing a same communication channel take throughput from one another. Beyond a certain quantity and/or density of the plurality N of configurable radio access entities 21, $i$, radio conflicts can no longer be avoided completely.

Therefore the method aims to reduce a number of radio conflicts as much as possible as a primary criterion (I). This results in increasing efficiency of the respective configurable radio access entity 21, $i$ since it shares the spectrum with fewer competing configurable radio access entities 21, $i$ and thus with fewer associated radio clients.

Besides conflict reduction, the method also aims to achieve an equal distribution of the available communication channels as a secondary criterion (II). On the one hand, this facilitates a choice between candidate channels having identical merits with regard to radio conflicts. On the other hand, it is expected that this maximizes a use of the available spectrum.

The result of the optimizing 13 may be a configuration specification including one or more of: a respective (presently) intended communication channel $x_i$, and a channel bandwidth for each of the plurality of configurable radio access entities 21, $i$.

In a more extensive implementation, the method 1 may further comprise providing 14, by the management entity 23, a visualization of the result of the optimizing 13.

The result of the optimizing 13 may comprise one or more of: a graph node for the respective receivable radio access entity 21, 22, $j$ (see FIGS. 1, 3 and 4, for example), a graph edge from the respective receivable radio access entity 21, 22, $j$ to the respective configurable radio access entity 21, $i$ (see FIGS. 3 and 4, for example), any of the above colored in accordance with the respective presently intended communication channel $x_{pi}$; the respective number $c_i$ of the receivable radio access entities 21, 22, $j$ of the respective configurable radio access entity 21, $i$ in its respective presently intended communication channel $x_{pi}$ (see FIGS. 5A-5E, for example), the total number of the receivable radio access entities 21, 22, $j$ of the respective configurable radio access entity 21, $i$ in the plurality C of communication channels, and any of the above before, during, and/or after the optimizing 13.

In a more extensive implementation, the method 1 may further comprise configuring 15, by the management entity 23, the respective configurable radio access entity 21, $i$ to use the respective presently intended communication channel $x_i$ in the channel allocation vector x as its respective communication channel.

FIGS. 5A-5E illustrate visualizations of respective results of subsequent optimization steps of the optimizing in another exemplary network system.

The wireless network 2 of said network system comprises a plurality of C=4 communication channels (channel numbers 1, 5, 9 and 13 in connection with the 2,4 GHz frequency band and 20 MHz channel bandwidth in Germany) and a plurality of N=70 configurable radio access entities 21.

The respective figure/graph comprises a plurality of N=70 graph nodes for the respective receivable radio access entity 21, $i$, and a graph edge from the respective receivable radio access entity 21, $j$ to the respective configurable radio access entity 21, $i$ in accordance with the adjacency matrix mentioned previously.

The respective configurable radio access entity 21, $i$ is associated with a respective number $c_i$ of the receivable radio access entities 21, $j$ in the respective presently intended communication channel $x_{pi}$.

FIG. 5A represents step 0 forming the starting point of the optimization of the radio performance of the wireless network 2. In this example, channel number 1 has been configured 111 in each of the plurality of N=70 configurable radio access entities 21 (access points) as the particular communication channel to start with. Step 0 is associated with 878 (initial) conflicts, and a maximum occurrence of the respective presently intended communication channel (channel number 1) of 70. In other words, all N=70 access points initially use channel number 1.

FIG. 5B illustrates the result of the optimization after a first iteration of the processing 133 step, which is associated with 161 remaining conflicts and a maximum occurrence of 22 of a most frequently used communication channel (#13) in the channel allocation vector x.

FIG. 5C shows the result of the optimization after a second iteration of the processing 133 step, which is associated with 150 remaining conflicts and a maximum occurrence of 19 of a most frequently used communication channel (#1) in the channel allocation vector x.

FIG. 5D depicts the result of the optimization after a third iteration of the processing 133 step, which is associated with 138 remaining conflicts and a maximum occurrence of 20 of a most frequently used communication channel (#1) in the channel allocation vector x.

FIG. 5E displays the result of the optimization after a fourth and a fifth iteration of the processing 133 step, which are respectively associated with 138 remaining conflicts and a maximum occurrence of 18 of a most frequently used communication channel (#9, #13) in the channel allocation vector x.

Due to lack of further improvement, the optimization is concluded after step 5 in accordance with acceptance criterion I.

The optimization is summarized in the following table:

| Step | Conflicts | Resolved Conflicts | Access points per channel | | | |
|---|---|---|---|---|---|---|
| | | | Ch. 1 | Ch. 5 | Ch. 9 | Ch. 13 |
| 0 | 878 | — | 70 | 0 | 0 | 0 |
| 1 | 161 | 717 | 7 | 20 | 21 | 22 |
| 2 | 150 | 11 | 19 | 17 | 17 | 17 |
| 3 | 138 | 12 | 20 | 17 | 18 | 15 |
| 4 | 138 | 0 | 17 | 17 | 18 | 18 |
| 5 | 138 | 0 | 17 | 17 | 18 | 18 |

The invention claimed is:

1. A method of optimizing a radio performance of a wireless network,
the wireless network comprising:
  a plurality of communication channels; and
  a plurality of configurable radio access entities;
the method comprising:
  determining, by a respective configurable radio access entity of the plurality of configurable radio access entities, a respective set of receivable radio access entities in a particular communication channel of the plurality of communication channels;
  collecting, by a management entity, the respective set of the receivable radio access entities determined by the respective configurable radio access entity of the plurality of configurable radio access entities; and
  optimizing, by the management entity, the radio performance of the wireless network in accordance with the respective set of the receivable radio access entities collected from the plurality of configurable radio access entities,
wherein the optimizing of the radio performance of the wireless network comprises:
  determining, for the respective configurable radio access entity, a respective total number of the receivable radio access entities in the plurality of communication channels,
  defining an order of a respective configurable radio access entity of interest in the plurality of configurable radio access entities in accordance with a decreasing order of the respective total number, and
  processing each of the plurality of configurable radio access entities as the respective configurable radio access entity of interest in accordance with the defined order,
wherein the processing comprises:
  computing a baseline value of a metric for the respective configurable radio access entity of interest in a respective presently intended communication channel, the respective presently intended communication channel being retrievable from a channel allocation vector comprising the respective presently intended communication channel of the plurality of configurable radio access entities, the computing being performed in accordance with one or both of:
    the respective receivable radio access entity of the respective configurable radio access entity of interest, and
    the respective configurable radio access entity comprising the respective configurable radio access entity of interest in its respective receivable radio access entities.

2. The method of claim 1,
the determining of the respective set of the receivable radio access entities in the particular communication channel comprising one or more of:
  configuring the respective configurable radio access entity to use the particular communication channel of the plurality of communication channels and to transmit on the same for an indicated time period,
  listening, by each of the plurality of configurable radio access entities, the particular communication channel responsive to a trigger event, and
  scanning, by each of the plurality of configurable radio access entities, the particular communication channel in a background of regular radio operation of the respective configurable radio access entity.

3. The method of claim 1,
the computing of the baseline value further being performed in accordance with:
  a respective weight of the respective configurable radio access entity.

4. The method of claim 3,
the respective weight being defined in accordance with one or more of:
  machine learning from a real usage behavior of the wireless network, and
  a pre-configuration.

5. The method of claim 1,
the processing further comprising:
  updating a respective number of the receivable radio access entities of the respective configurable radio access entity of interest in a respective candidate communication channel, the respective candidate communication channel being selectable from a whitelist of those of the plurality of communication channels being useable by the respective receivable radio access entity.

6. The method of claim 5,
the processing further comprising:
computing a prospective value of the metric for the respective configurable radio access entity of interest in the respective candidate communication channel, the computing being performed in accordance with one or both of:
the respective receivable radio access entity of the respective configurable radio access entity of interest, and
the respective configurable radio access entity comprising the respective configurable radio access entity of interest in its respective receivable radio access entities.

7. The method of claim 6,
the computing of the prospective value further being performed in accordance with:
the respective weight of the respective configurable radio access entity.

8. The method of claim 6,
the processing further comprising:
accepting the respective candidate communication channel as the respective presently intended communication channel of the respective configurable radio access entity of interest in accordance with at least one acceptance criterion of:
the prospective value of the metric is lower than the baseline value of the metric, and
the prospective value of the metric equals the baseline value of the metric, and an occurrence of the respective candidate communication channel in the channel allocation vector is less than an occurrence of the respective presently intended communication channel in the channel allocation vector.

9. The method of claim 1, further comprising:
providing, by the management entity, a visualization of a result of the optimizing.

10. The method of claim 9,
the result of the optimizing comprising one or more of:
a graph node for the respective receivable radio access entity,
a graph edge from the respective receivable radio access entity to the respective configurable radio access entity,
any of the above colored in accordance with the respective presently intended communication channel,
the respective number of the receivable radio access entities of the respective configurable radio access entity in its respective presently intended communication channel,
the total number of the receivable radio access entities of the respective configurable radio access entity in the plurality of communication channels, and
any of the above before, during, and/or after the optimizing.

11. The method of claim 1, further comprising:
configuring the respective configurable radio access entity to use the respective presently intended communication channel in the channel allocation vector as its respective communication channel.

12. The method of claim 1,
the wireless network comprising an IEEE 802.11 wireless local area network, WLAN, and
the respective configurable radio access entity comprising an access point, AP.

13. The method of claim 1,
the plurality of receivable radio access entities comprising the plurality of configurable radio access entities.

14. The method of claim 13,
the plurality of receivable radio access entities further comprising one or more radio access entities not being configurable by the management entity.

15. A management entity for optimizing a radio performance of a wireless network,
the wireless network comprising:
a plurality of communication channels; and
a plurality of configurable radio access entities;
the management entity comprising a processor configured to:
collect a respective set of receivable radio access entities determined by a respective configurable radio access entity of the plurality of configurable radio access entities in a particular communication channel of the plurality of communication channels; and
optimize the radio performance of the wireless network in accordance with the respective set of the receivable radio access entities in the particular communication channel collected from the plurality of configurable radio access entities,
wherein for the optimizing of the radio performance of the wireless network, the processor is further configured to:
determine, for the respective configurable radio access entity, a respective total number of the receivable radio access entities in the plurality of communication channels,
define an order of a respective configurable radio access entity of interest in the plurality of configurable radio access entities in accordance with a decreasing order of the respective total number, and
process each of the plurality of configurable radio access entities as the respective configurable radio access entity of interest in accordance with the defined order,
wherein the processor is further configured to:
compute a baseline value of a metric for the respective configurable radio access entity of interest in a respective presently intended communication channel, the respective presently intended communication channel being retrievable from a channel allocation vector comprising the respective presently intended communication channel of the plurality of configurable radio access entities, the computing being performed in accordance with one or both of:
the respective receivable radio access entity of the respective configurable radio access entity of interest, and
the respective configurable radio access entity comprising the respective configurable radio access entity of interest in its respective receivable radio access entities.

16. The management entity of claim 15, comprising one of:
a cloud-based management entity,
a controller of the wireless network, and a particular configurable radio access entity of the plurality of configurable radio access entities of the wireless network.

17. The management entity of claim 15,
the processor further being configured to provide a visualization of the optimized radio performance of the wireless network.

18. A system, comprising:
a wireless network comprising:
    a plurality of communication channels; and
    a plurality of configurable radio access entities; and
a management entity according to claim 15 for optimizing a radio performance of the wireless network.

19. A non-transitory computer-readable medium storing a computer program, comprising:
instructions which, when the computer program is executed by a computer, cause the computer to carry out the method of claim 1.

\* \* \* \* \*